US008804898B2

(12) United States Patent
Leckey et al.

(10) Patent No.: US 8,804,898 B2
(45) Date of Patent: Aug. 12, 2014

(54) SPECIAL NUCLEAR MATERIAL SIMULATION DEVICE

(75) Inventors: John H. Leckey, Knoxville, TN (US); Amy DeMint, Kingston, TN (US); Jack Gooch, Seymour, TN (US); Todd Hawk, Knoxville, TN (US); Chris A. Pickett, Clinton, TN (US); Chris Blessinger, Knoxville, TN (US); Robbie L. York, Kingston, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 476 days.

(21) Appl. No.: 12/835,123

(22) Filed: Jul. 13, 2010

(65) Prior Publication Data

US 2011/0015914 A1    Jan. 20, 2011

Related U.S. Application Data

(60) Provisional application No. 61/225,423, filed on Jul. 14, 2009.

(51) Int. Cl.
*G21C 3/00* (2006.01)
*G01T 7/00* (2006.01)
*G21C 3/40* (2006.01)
*G21C 3/12* (2006.01)

(52) U.S. Cl.
CPC . *G01T 7/00* (2013.01); *Y02E 30/38* (2013.01); *Y02E 30/40* (2013.01); *G21C 3/12* (2013.01)
USPC ........................................... 376/409; 376/450

(58) Field of Classification Search
CPC ........... Y02E 30/40; Y02E 30/38; G21C 3/12
USPC ........................... 342/409, 450; 376/409, 450
See application file for complete search history.

(56) References Cited

U.S. PATENT DOCUMENTS

| 2,917,383 | A | * | 12/1959 | Saller ............................. 419/46 |
| 3,215,607 | A | * | 11/1965 | Lackey ......................... 376/455 |
| 3,720,581 | A | * | 3/1973 | Kaser ............................ 376/287 |
| 3,731,101 | A | * | 5/1973 | Peterson et al. ........... 250/506.1 |
| 3,865,746 | A | * | 2/1975 | Rubin et al. .................. 252/637 |
| 3,976,888 | A | | 8/1976 | Miller et al. |
| 4,363,775 | A | * | 12/1982 | Bussard et al. .............. 376/133 |
| 4,509,042 | A | | 4/1985 | Kruse |

(Continued)

FOREIGN PATENT DOCUMENTS

| GB | 1593811 A | 7/1981 |
| WO | 2006078691 A2 | 7/2006 |
| WO | 2008088386 A2 | 7/2008 |

*Primary Examiner* — Frank J McGue
(74) *Attorney, Agent, or Firm* — Michael J. Renner, Esq.; Luedeka Neely Group, P.C.

(57) ABSTRACT

An apparatus for simulating special nuclear material is provided. The apparatus typically contains a small quantity of special nuclear material (SNM) in a configuration that simulates a much larger quantity of SNM. Generally the apparatus includes a spherical shell that is formed from an alloy containing a small quantity of highly enriched uranium. Also typically provided is a core of depleted uranium. A spacer, typically aluminum, may be used to separate the depleted uranium from the shell of uranium alloy. A cladding, typically made of titanium, is provided to seal the source. Methods are provided to simulate SNM for testing radiation monitoring portals. Typically the methods use at least one primary SNM spectral line and exclude at least one secondary SNM spectral line.

20 Claims, 2 Drawing Sheets

(56) References Cited

U.S. PATENT DOCUMENTS

| | | | |
|---|---|---|---|
| 5,433,693 A * | 7/1995 | Ott | 600/1 |
| 6,512,805 B1 * | 1/2003 | Takeda et al. | 376/171 |
| 2002/0025016 A1 * | 2/2002 | Venneri et al. | 376/195 |
| 2011/0286570 A1 * | 11/2011 | Farmer et al. | 376/416 |

* cited by examiner

SPECIAL NUCLEAR MATERIAL SIMULATION DEVICE

CROSS REFERENCES TO RELATED APPLICATIONS

This patent application claims priority from and is related to U.S. Provisional Patent Application Ser. No. 61/225,423 filed Jul. 14, 2009, entitled: Special Nuclear Material Simulation Device. Provisional Patent Application Ser. No. 61/225,423 is incorporated by reference in its entirety herein.

GOVERNMENT RIGHTS

The U.S. Government has rights to this invention pursuant to contract number DE-AC05-00OR22800 between the U.S. Department of Energy and Babcock & Wilcox Technical Services Y-12, LLC.

This invention was made with government support under Contract No. DE-AC05-00OR22725 awarded by the U.S. Department of Energy. The government has certain rights in the invention.

FIELD

This disclosure relates to the field of nuclear energy. More particularly, this disclosure relates to radioactive sources for simulating special nuclear material.

BACKGROUND

Special nuclear material (SNM) is a term that refers to fissile materials which, in sufficient quantity, can be used to produce a nuclear weapon. The detection of SNM is an important part of international efforts to interdict such material that is being transported illicitly. To detect that activity, SNM monitoring systems are deployed at transportation portals where SNM might be conveyed. These systems use a variety of methods to detect SNM. One of the methods is gamma ray spectroscopy. It is very desirable to provide a means for checking the operability of such monitoring systems. However, a full-scale direct check of operability would require passing a large mass of SNM through the portal to test the monitor. Such a process is very undesirable because of the potential for diversion of the SNM test mass to rogue entities and the potential for accidental or terrorist-initiated dispersion of the material that might result in exposure of the public to hazardous material. What are needed therefore are devices that simulate comparatively large quantities of SNM and that can be used to check the operability of SNM monitoring systems without entailing the very undesirable risks involved with the use of large quantities of SNM.

SUMMARY

The present disclosure provides an apparatus for simulating special nuclear material. Typically the apparatus has a shell that includes enriched uranium. The shell has an interior surface and an exterior surface. Also typically provided is a depleted uranium core that is disposed within the shell. Generally a spacer is provided and the spacer is disposed adjacent the interior surface of the shell, for separating the depleted uranium core from the shell. A cladding is also generally provided, the cladding being disposed adjacent the exterior surface of the enriched uranium shell.

Also provided is a method of testing a special nuclear material monitoring system. The method includes a step of exposing the special nuclear material monitoring system to a simulated radioactive source that has at least one primary spectral line that is associated with a highly enriched uranium source and that does not have at least one secondary radiation spectral line that is associated with a highly enriched uranium radioactive source. Generally the radioactive source is radiating substantially uniformly over a solid angle of substantially 4 pi steradians. The method also provides for detecting whether the radiation monitoring system alarms for the presence of special nuclear material in the presence of a simulated radioactive source.

BRIEF DESCRIPTION OF THE DRAWINGS

Various advantages are apparent by reference to the detailed description in conjunction with the figures, wherein elements are not to scale so as to more clearly show the details, and wherein.

DETAILED DESCRIPTION

Figure 1:
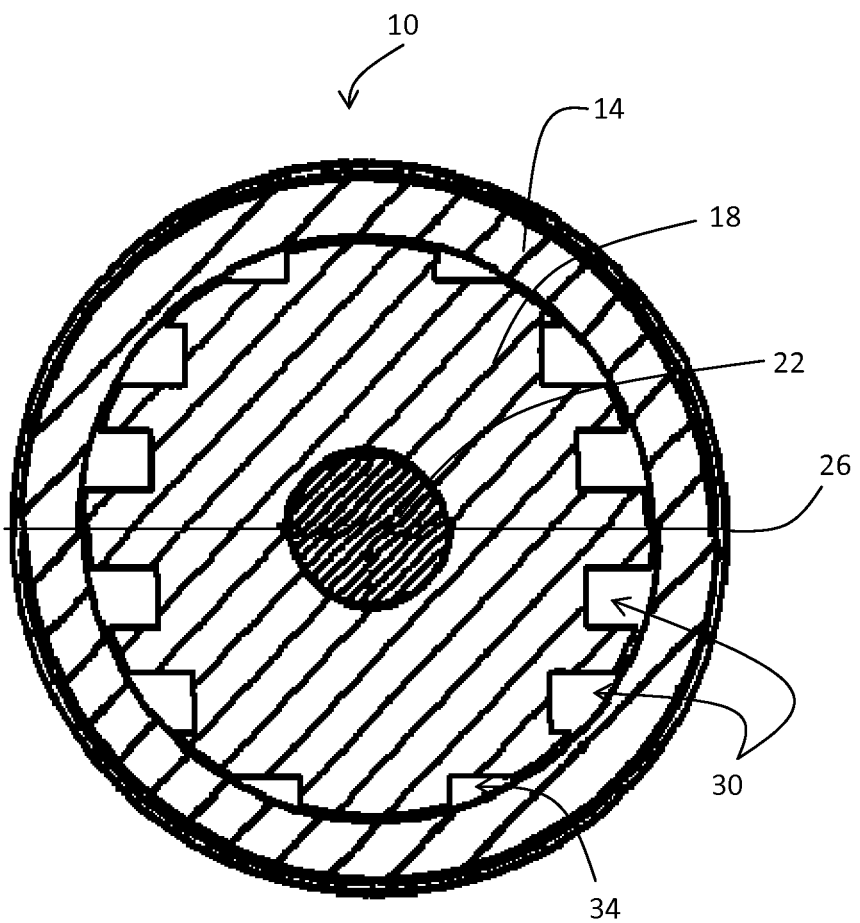
FIG. 1 is a cross-sectional view of an embodiment of an apparatus for simulating special nuclear material.

In the following detailed description of the preferred embodiments, reference is made to the accompanying drawings, which form a part hereof, and within which are shown by way of illustration the practice of specific embodiments of an apparatus for simulating special nuclear material (SNM) and embodiments of methods for testing an SNM monitoring system. It is to be understood that other embodiments may be utilized, and that structural changes may be made and processes may vary in other embodiments.

While the detection of small quantities of SNM is highly desirable, it is essential that SNM monitoring systems reliably detect large quantities of SNM, such as a 2.5 kg sphere of highly enriched uranium (HEU). However, as previously discussed, it is very undesirable to transport such a large quantity of SNM in order to verify the operability of portal monitor systems. Fortunately, by employing judiciously-selected configurations of components, it has been found that the primary gamma ray spectral lines of a 2.5 kg sphere of approximately ninety percent enriched uranium may be substantially matched using a much smaller quantity of enriched uranium. For example, in an exemplary embodiment, approximately 46 g (grams) of 93% HEU (i.e., approximately 43 g of $^{235}$U) may be alloyed with aluminum to produces a gamma ray spectrum that closely resembles a solid sphere of 2.5 kg of 90% enriched $^{235}$U. Note that in this example the enrichment of the uranium within the shell (93% $^{235}$U) and the apparent enrichment of the simulated sphere (90% $^{235}$U) is not the same. Note also that different masses of HEU and different ratios of HEU and aluminum may be used to simulate different amounts of 90% $^{235}$U or to simulate large quantities of different enrichment levels of uranium. The fabrication of a radiation source using a low quantity of HEU to simulate a large quantity of HEU may be accomplished in part by alloying the HEU with aluminum and placing it in a spherical shell. This configuration minimizes the self absorbance (self-shielding) of the 186 keV gamma rays from $^{235}$U. A preferred embodiment also substantially matches the 1001 keV gamma ray response from the $^{238}$U in 2.5 kg of 90% enriched $^{235}$U by providing a mass of depleted uranium in the assembly.

The small amount (e.g., 46 g) of 93% enriched U-235 is classified as a "Category IV" SNM quantity by the U.S.

Government. Of course Category IV quantities still require security protection but the protection is at a level that is considerably reduced from what is required for a 2.5 kg sphere of highly enriched uranium. The alloyed form of the HEU places the material in "Attractiveness Level C." "Attractiveness" is a measure of how useful a particular form of special nuclear material would be if diverted to rogue purposes. Again, Attractiveness Level C materials require security protection but the protection is at a level that is considerably reduced from what is required for a 2.5 kg sphere of highly enriched uranium (which is likely "Attractiveness Level B"). In addition, various embodiments of an apparatus for simulating special nuclear material that are disclosed herein may be configured to pass Nuclear Regulatory Commission tests to qualify as a "sealed source." These quantities, forms, and configurations greatly simplify the handling, monitoring, transport, and storage of an apparatus for testing a special nuclear material monitoring system.

Preferred embodiments of an apparatus for simulating special nuclear material that are disclosed herein provide a radioactive source that radiates substantially uniformly over a solid angle of substantially 4 pi steradians. This omni-directional characteristic facilitates standardized testing with repeatable results compared with other source geometries.

One embodiment of such an apparatus for simulating SNM is illustrated in FIG. 1 as apparatus 10. The apparatus 10 is referred to as a "radioactive source," as are various other radiation producing devices used for medical, agricultural, and industrial purposes. In the embodiment of FIG. 1 the components of the apparatus 10 are substantially concentric spherical shapes, but in other embodiments the components may be formed as different shapes, such as concentric cylindrical shapes. The apparatus 10 has a shell 14 that comprises enriched uranium. The uranium is typically enriched to greater than about ninety weight percent $^{235}$U. Generally the shell 14 comprises less than about fifty grams of $^{235}$U. In a typical embodiment the shell comprises an alloy of enriched uranium, such as an aluminum-uranium alloy. Such alloys typically have less than about five weight percent enriched uranium. Disposing the enriched uranium in a spherical shell provides a radioactive source that radiates substantially uniformly over a solid angle of substantially 4 pi steradians. In other words, it radiates in all directions.

Inside the shell 14 is an aluminum spacer 18. In the embodiment of FIG. 1 the aluminum spacer 18 is fabricated from 6061 aluminum alloy, but in other embodiments a different material (such as pure aluminum, a different aluminum alloy, other metal, or ceramic) may be used to form a spacer. Inside the aluminum spacer 18 is a depleted uranium core 22. Depleted uranium (DU) is uranium in which the weight percentage of $^{235}$U is less than 0.711%. Typically, the percentage concentration by weight of the uranium isotopes in DU is about 99.8% $^{238}$U, and about 0.2% $^{235}$U (with a trace amount of $^{234}$U). The depleted uranium core 22 is provided to more accurately simulate the contribution made by $^{238}$U to the gamma ray spectrum of a 2.5 kg sphere of approximately ninety percent enriched uranium. The aluminum spacer 18 is configured to position the depleted uranium core 22 at the geometric center of the shell 14. Cladding 26 forms the outer layer of the apparatus 10. In the embodiment of FIG. 1 the cladding 26 is fabricated from commercially pure titanium, but in other embodiments a titanium alloy or a different material may be used.

In the embodiment of FIG. 1, the depleted uranium core 22 is machined as a solid sphere. In other embodiments the depleted uranium core 22 may be cast and may have a different geometric shape. In the embodiment of FIG. 1 the aluminum spacer 18 is fabricated as two hemispheres, but in other embodiments the aluminum spacer 18 may be fabricated as a different shape. In the embodiment of FIG. 1 the depleted uranium core 22 is positioned inside the aluminum spacer 18 hemispheres. The aluminum spacer 18 hemispheres are positioned adjoining each other but in this embodiment the aluminum spacer 18 hemispheres are not fastened together. In the embodiment of FIG. 1 the aluminum-uranium alloy shell 14 were cast as two hemispheres and the hemispheres were machined to achieve desired final dimensions. In other embodiments the aluminum-uranium alloy shell may be fabricated differently. In the embodiment of FIG. 1, the aluminum spacer 18 (with the depleted uranium core 22 inside) was placed inside the aluminum-uranium alloy shell 14 hemispheres. The aluminum-uranium alloy shell 14 hemispheres were positioned adjoining each other but in this embodiment the aluminum-uranium alloy shell 14 hemispheres are not fastened together. In the embodiment of FIG. 1 the titanium cladding 26 was spun-formed as two hemispheres; in other embodiments the titanium cladding may be fabricated in a different manner. In the embodiment of FIG. 1 the aluminum-uranium alloy shell 14 (with the depleted uranium core 22 and the aluminum spacer 18 inside) was placed inside the titanium cladding 26 hemispheres and the titanium cladding 26 hemispheres were welded together under vacuum to form the apparatus 10. In fabricating the titanium cladding 26 hemispheres in accordance with the embodiment of FIG. 1, it is beneficial to provide a step joint cut around the interior rims of the two hemispheres so that when the titanium cladding 26 hemispheres are welded together the weld bead is spaced apart from the aluminum-uranium alloy shell 14.

As previously indicated, the assembly 10 is designed to simulate a large quantity of SNM, primarily for the purpose of testing the operability of radiation monitoring systems. SNM monitoring systems may look for the presence or absence of at least one of the following primary spectral lines:

(1) a 185.7 keV gamma radiation spectral line; and
(2) a 1001 keV gamma radiation spectral line.

In addition, SNM monitoring systems may look for the presence or absence of one or more of the following secondary spectral lines:

(1) 94-98 keV X-ray spectral lines; and
(2) a 766.6 keV gamma radiation spectral line.

Figure 2:
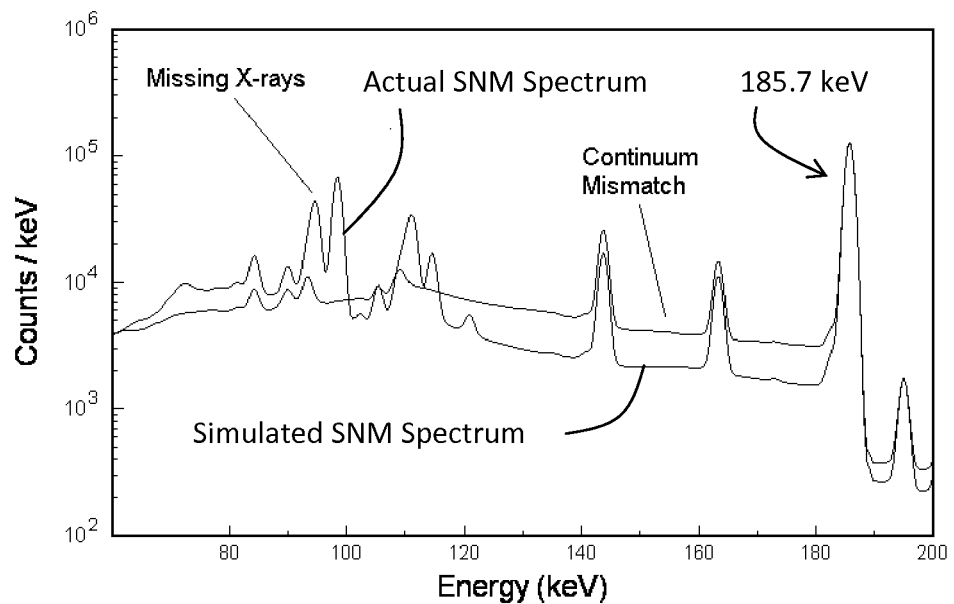
FIGS. 2 and 3 are spectrographs of energy regions of radiation emissions from an actual SNM source and a simulated SNM source.
Figure 3:
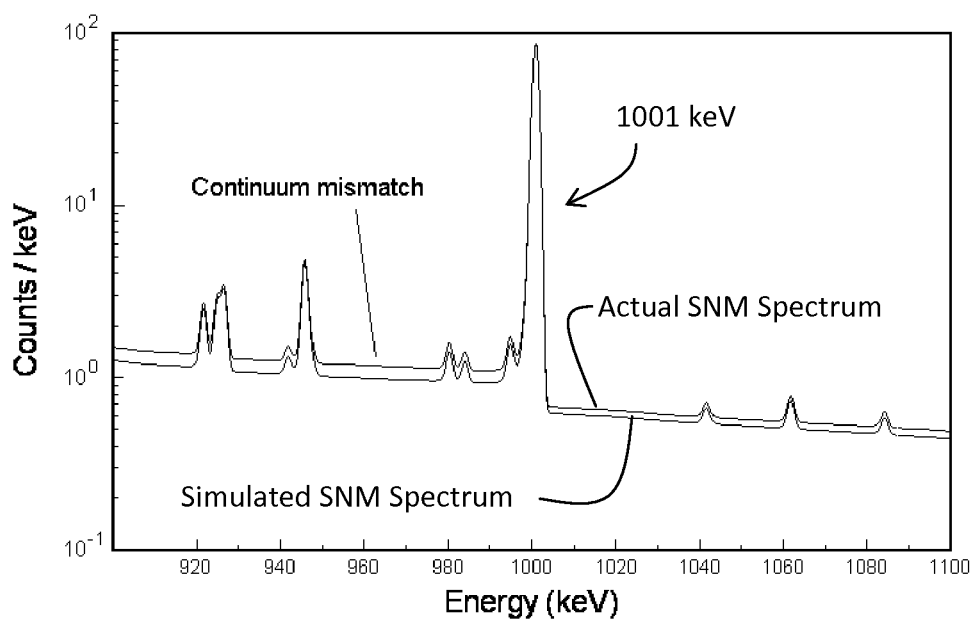

Various embodiments of apparatus for simulating SNM that are described herein typically present radiation in at least one primary spectral line and typically omit one secondary spectral line. For example, FIG. 2 depicts 185.7 keV gamma rays that would likely be present in an actual SNM source (i.e., a 2.5 kg sphere of highly enriched uranium), and that may be present in a simulated SNM source. FIG. 2 also depicts 94-98 keV x-rays from Compton scattering that would likely be present in a 2.5 kg sphere of highly enriched uranium but that may not be present in a simulated SNM source. FIG. 3 depicts 1001 keV gamma rays that would likely be present in a 2.5 kg sphere of highly enriched uranium, and that may be present in a simulated SNM source. FIGS. 2 and 3 also illustrate that there may be some continuum mismatches between an actual SNM spectrum and a simulated SNM spectrum.

As used herein the terms "actual SNM spectrum" and "actual SNM source" refer to sources that contain large amounts of special nuclear material. As used herein the terms "simulated SNM spectrum" and "simulated SNM source" refer to spectra from sources (and the sources themselves) that may contain some SNM, but that contain SNM in quantities much less quantity (typically $\frac{1}{50}^{th}$) of SNM than the corresponding actual source contains.

For further definitional clarity, a simulated SNM spectrum is considered herein to generally match an actual SNM spectrum if the counts/keV at the peak minus the counts at the base (i.e., the net peak height) of a simulated primary spectral line that is being used to simulate actual SNM do not deviate by more than a factor of about fifty percent from the counts/keV at the peak minus the counts at the base (i.e., the net peak height) of the actual primary spectral line that is being simulated. A simulated SNM spectrum is considered herein to not generally match an actual SNM spectrum if the counts/keV at the peak minus the counts at the base (i.e., the net peak height) of a simulated primary spectral line that is being used to simulate actual SNM deviates by a factor of more than about fifty percent from the counts/keV at the peak minus the counts at the base (i.e., the net peak height) of the actual primary spectral line that is being simulated. A simulated SNM spectrum is considered herein to substantially match an actual SNM spectrum if the counts/keV at the peak minus the counts at the base (i.e., the net peak height) of a simulated primary spectral line that is being used to simulate actual SNM do not deviate by more than a factor of about ten percent from the counts/keV at the peak minus the counts at the base (i.e., the net peak height) of the actual primary spectral line that is being simulated. A simulated SNM spectrum is considered herein to not substantially match an actual SNM spectrum if the counts/keV at the peak minus the counts at the base (i.e., the net peak height) of a simulated primary spectral line that is being used to simulate actual SNM deviates by a factor of more than about ten percent from the counts/keV at the peak minus the counts at the base (i.e., the net peak height) of the actual primary spectral line that is being simulated.

A typical application for testing a special nuclear material monitoring system includes a step of exposing the special nuclear material monitoring system to a simulated radioactive source that generally matches at least one primary spectral line that is associated with a highly enriched uranium source and that does not generally match at least one secondary radiation spectral line that is associated with a highly enriched uranium radioactive source, where the radioactive source is radiating substantially uniformly over a solid angle of substantially 4 pi steradians. Some embodiments involve a step of exposing the special nuclear material monitoring system to a simulated radioactive source that substantially matches at least one primary spectral line that is associated with a highly enriched uranium source and that does not substantially match at least one secondary radiation spectral line that is associated with a highly enriched uranium radioactive source. These applications then detect whether the radiation monitoring system alarms for the presence of special nuclear material in the presence of the simulated radioactive source. Radiation monitoring systems that indicate an alarm under these conditions pass the test and radiation monitoring systems that do not indicate an alarm under these conditions do not pass the test. In some of these tests the simulated radioactive source has a primary radiation spectral line that substantially matches the 186 keV gamma radiation emission line from $^{235}$U. In some of these tests the simulated radioactive source has a primary radiation spectral line that substantially matches the 1001 keV gamma radiation emission line from $^{238}$U. In some tests the simulated radioactive source does not have a radiation spectral line that substantially matches x-rays at energy levels of about 94-98 keV. In some tests the simulated radioactive source does not have a radiation spectral line that substantially matches gamma radiation at energy levels of about 766 keV.

In addition to generally or substantially matching spectrographic characteristics of actual SNM sources, it is generally important that simulated SNM sources meet the requirements that various regulatory agencies impose on radioactive source assemblies and using testing methods specified by those agencies. One category of requirements pertains to "sealed sources." Sealed sources must be able to withstand various tests, including a 9 meter drop test, a percussion test, and a heat test that exposes the source assembly to a temperature of 800° C. for ten minutes. The purpose of these tests is to ensure that the radioactive source assembly does not rupture and disperse radioactive source material under such adverse conditions. Various detailed design features may be employed to provide an apparatus for simulating SNM that is likely to pass these tests.

For example, simplified thermo-mechanical analysis indicates that both the aluminum spacer 18 and the aluminum-uranium alloy spherical shell 14 may melt during the heat test, resulting in a volume expansion of up to 18%. Such expansion will stress the titanium cladding 26 in the radial direction. Stress-strain data for the titanium cladding 26, indicates the titanium cladding 26 will not crack or rupture, and is sufficiently elastic to expand during this test. However, to better ensure against fracture of the titanium cladding 26, the aluminum spacer 18 (as depicted in FIG. 1) has a series of grooves 30 and steps 34 formed in its outer surface. Some embodiments of a spacer may comprise one groove. Some embodiments may comprise one step. Some embodiments may comprise one groove and one step. The one or more grooves 30 and/ or one or more steps 34 provide open space to absorb the expected thermal expansion of the aluminum spacer 18 and the aluminum-uranium alloy shell 14 during the heat test. Typically the hemispheres that form the titanium cladding 26 are welded under vacuum so that the grooves 30 and the steps 34 form dead space, not an air space.

EXAMPLE

Various trial apparatuses were fabricated using aluminum-uranium alloys. Several non-functional versions were fabricated using pure aluminum (or 6061 aluminum alloy) and depleted uranium for the purposes of thermal and mechanical evaluation. Several functional versions were fabricated using aluminum and uranium enriched to 93% $^{235}$U in ratios that were targeted to result in an alloy containing 95.55% by weight Al and 4.45% by weight HEU. Since uranium has very little solubility in aluminum at room temperature, the cast material is expected to be a mixture of primary aluminum and eutectic, with the eutectic being composed of aluminum and uranium tetra-aluminide ($UAl_4$).

Alloy development was performed using vacuum induction melting in a yttria coated graphite crucible. Initially sample alloys were cast in a slab mold and the resultant castings were inspected to evaluate three resultant casting characteristics. The first characteristic is casting soundness. It is very desirable that hemispherical shells of aluminum-uranium alloy be cast that are free of voids and large surface defects. This characteristic was evaluated using visual examination and x-ray inspection. No major defects in casting soundness were observed in the slab molded parts.

The second characteristic is casting homogeneity. That is, it is desirable that the uranium be uniformly dispersed throughout the alloy. An Al-U eutectic exists at 13.2 wt. % U with a melting point of about 640° C., which is only slightly less than the 660° C. melting point for pure aluminum. Thermally this would be a convenient composition but it requires more than the desired amount of HEU. Typically the chosen alloy composition has a lower uranium composition than the eutectic (i.e., it is hypoeutectic) and thus has a melting point that is typically between 640° C. and 660° C. The chemical homogeneity of slab molded samples was evaluated using gross counts from passive gamma ray mapping of a 92 keV gamma ray produced in the $^{238}$U decay chain. For the gamma ray mapping, lead shielding was used in an attempt to focus the readings to as discrete a region on the material surface as possible. The detector was counted using a 2×2 sodium iodide (NaI) scintillation detector. The high voltage to the detector was supplied by the card in the computer that also contained the amplifier, analog-to-digital converter and multichannel buffer. The detector was shielded on both sides and on top. The detector was further shielded from the sample by a steel ring approximately 2 inches in length and having a 2 centimeter opening. This is used in order to reduce the area that the detector is measuring, with the intent of being able to provide more localized homogeneity data. Counting data was collected for 400 seconds and the 92 keV region was integrated. The results of the gamma ray mapping for 12 counting areas on each side was an average of 16500 (integrated over the 400 seconds) with a standard deviation of 3.7%. Background counts were about 2000 (integrated over the 400 seconds). This indicated an acceptably low level of gravitational segregation.

A third desirable characteristic is that the hemispherical shells of aluminum-uranium alloy have the precisely desired chemical composition. For the chemical analysis, five 0.1 g aliquots were taken from each of the three samples. Each of these five was dissolved in concentrated hydrochloric acid and heated to 60° C. for one hour. The composition of the casting was evaluated by analyzing the samples using inductively coupled plasma (ICP) chemical analysis. Chemical analysis of the three samples indicated uranium composition values of 2.59%, 3.32%, and 3.03%, with an aliquot variation of about 5.6% relative. These results agree reasonably well with the target value of 3% for this initial casting and exhibited a scatter greater than the gamma ray counting scatter. The smaller amount of scatter from the gamma ray counting data may have been due to a broader region of the material being sampled.

Following the evaluation of the alloy based upon slab mold tests, further castings were made of hemi-shell objects using a lugless hemi-shell graphite mold. Depleted uranium was used initially to test the hemisphere casting process. Best results were obtained when a two step melting approach was used. The first step involved producing an aluminum-uranium mixture with composition 10% uranium by weight. The second step involved re-melting this material in the crucible with sufficient aluminum to produce the target alloy composition. This technique allowed the final casting to be produced from a melt at less than 800° C., a much lower temperature than required to melt pure uranium. Castings so produced had about 30% excess stock in the radial dimension and produced an adequate finished component. Large visible flaws did exist, however, on the internal surface of the object, but these were not considered to be functionally detrimental. Subsequent castings were made using a pole-up graphite mold. Temperatures may be more easily controlled in such a mold, and virtually flaw-free parts may be cast.

Two samples were taken from the casting for chemical analysis. The chemical analysis showed 5.02% uranium at the inner surface of the pole and 4.67% uranium at the inner surface closer to the equator. A number of additional castings of the Al-DU alloy were made and chemical sampling showed the composition of the castings to be within 5 relative percent of the target value of 4.45% uranium. All of these castings, although of sufficient quality for the intended purpose, had some pitting on either the inner or outer surfaces.

The cast blanks were machined on a dual spindle 7-axis CNC machining center containing a 20 tool magazine and quick change tooling. Due to the geometry of the components, both spindles and custom fixturing were used. Once finished, the edges were hand filed to remove any burrs, and then dimensionally checked using hand calipers and a step height gauge. Tolerances for all features were +/−0.002". All tooling used quick change tool holders. Coolant was CIMTECH 500 [trademark] (~3%) and water (~97%). The material, overall, machined like pure aluminum.

The finish-machined HEU hemi-shells each had an exterior radius of about 59.87 mm and an interior radius of about 49.87 mm. The combined mass of two hemi-shells was about 1047 g with a combined volume of 379.4 cm$^3$. This provides a calculated resultant density of 2.76 g/cm$^3$. If the alloy is an ideal mixture of eutectic and free aluminum, and assuming that the uranium present as UAl$_4$ with a density of 5.7 g/cm$^3$, the theoretical density of the alloy is 2.79 g/cm$^3$. This would imply a porosity value of the machined components of 1.1%, which is subjectively consistent with the visual pitting and subsequent qualitative x-ray analysis. However, if there was an unaccounted volume change on mixing or some non-uniformity of the alloy composition, the data would support a conclusion that the parts may have had less than 1.1% porosity.

Chemical analysis of two machine chip samples indicated a composition of 3.85% uranium, about 13% below the target value of 4.45%. This low value may be due to some oxidation of the samples.

Several of the finished machined alloy shells were x-rayed to evaluate the components for porosity and alloy chemical uniformity. One side of the object was first inspected using pole, upper right, and upper left views. Uniformity of the cast material was evaluated and thin strands of the high density material were observed primarily at the pole of the part. Small voids were also revealed more toward the lip of the object. Inspections were performed using a high-resolution, lens coupled digital radiography system at 420 KeV, and 10 mA conditions with a 5"×5" zoom configuration. The technique included a source-to-detector distance of 16 feet with the object located at the detector.

Individual components were designed with approximately a 0.13 mm gap between each of the component layers to accommodate machining tolerances of 0.05 mm and to provide for volume expansion/contraction due to temperature fluctuations during use.

The depleted uranium core was machined from commercially available DU to a radius of approximately 13.8 mm and weighed about 208 g.

6061 aluminum alloy hemispherical spacers were machined on a computer numerical control (CNC) machine center. Bar stock was turned to form both the exterior surface and the interior surface. A hemispherical cup having a radius of approximately 14.48 mm was machined in the interior surface of each hemispherical spacer and the exterior surface of each hemispherical spacer had a radius of about 49.74 mm. As seen in FIG. 1, two full circumferential grooves 30 having a maximum depth of about 11.43 mm and a width of about 10.16 mm were cut near the equator and the mid-latitude of each hemisphere. A step 34 having a width of about 11.43 mm was cut near the pole of each hemisphere.

The Ti cladding hollow hemispheres were spun formed with an outside diameter of about 61.6 mm. The titanium shells were designed to have a thickness of about 2.3 mm. However, the inner contours required additional machining to clean up some interior contour errors and produce a relatively uniform inside surface of about 60 mm diameter, leaving a thickness of about 1.6 mm. A step joint suitable for joining pairs of hemispheres was machined along the rim of each hemisphere.

The two titanium components with the step joint configuration were welded to encapsulate the Al-U components using a 7.5 kilowatt electron beam welding machine. The welding technique consisted of two passes. The first pass was to achieve penetration past the step and the second cosmetic pass was to blend/smooth the weld surface. Prior to welding, various parameters were run using flat plates and one test part to "zero-in" on parameters that would achieve step-depth penetration. Modified Faraday Cup data was also taken during trials to characterize the machine and assure process control. Two articles containing depleted uranium alloy components and one article containing enriched uranium alloy were fabricated in this manner.

After welding, the completed assembly was radiographically inspected with horizontal and tilted views. All components of the assembly appeared to be in the correct location. No details of the peripheral weld could be resolved (visually discerned). Inspections were performed using a high-resolution, lens coupled digital radiography system at 420 KeV, and 10 mA conditions with a 5"×5" zoom configuration. The technique included a source-to-detector distance of 16 feet with the object located at the detector.

The heat test was performed according to the specifications in 49 CFR 173.469. This requires the specimen to be heated in air to a temperature of not less than 800° C. (1475° F.), held at that temperature for a period of 10 minutes, and then allowed to cool. The test was performed on one of the assemblies containing Al-DU alloy components. The test was successful and no deformation of the outer shell was observed.

Both before and after the heat test, a gamma-ray scan was performed on the test article. The gamma-ray scan was performed using the same equipment as was used for the rough cast hemi-shells. In this case, six symmetric points were chosen (4 along the equator and 1 at each of the poles) for measurement. The probe was placed almost directly on the object, and each of the six locations was counted for 300 seconds. The scan before the test resulted in a mean net count value of 91,700 (integrated over the 300 seconds) with a standard deviation of 2900 (integrated over the 300 seconds). Measurements around the equator appeared to be slightly less than at the poles. The scan after the test resulted in a mean net count value of 95,600 (integrated over the 300 seconds) with a standard deviation of 3500.

This assembly was then leak tested. The leak test involved first pressurizing the object with 44.7 psia of helium for 16 hours then evacuating the helium from the chamber. Following evacuation of the helium, the chamber holding the assembly was further evacuated with a turbomolecular pump, and the evolution of helium was monitored with a mass spectrometer. The mass spectrometer response indicated a helium leak of $1.6 \times 10^{-6}$ cm$^3$(STP)s$^{-1}$ for the assembly. Using ASTM Method E 493-06, the leak rate for certification was calculated to be $3 \times 10^{-5}$ cm$^3$(STP)s$^{-1}$, which is the projected leak if the cavity of the assembly contained 100% helium at one atmosphere pressure. Since the acceptance leak value is $1.3 \times 10^{-4}$ cm$^3$(STP)s$^{-1}$, the assembly was within the acceptable leak range.

An impact and percussion test was performed on a second Al-DU assembly. The impact test involved dropping the assembly from nine meters onto an unyielding surface. The percussion test involved dropping a 1.4 kg steel billet from one meter onto the assembly. The drop resulted in about a 1-inch diameter flat spot on the test unit. It bounced about 12 to 18 inches high on impact. The percussion test left a small (~0.5 inch×~0.1 inch) arc-shaped indentation from the metal billet at the point of impact. These results were as expected. No breach was observed, no contamination leakage detected, and the unit passed the leak test.

In summary, embodiments disclosed herein provide an apparatus for simulating special nuclear material. The small amount (e.g., 46 g) of 93% enriched U-235 is classified as a "Category IV" SNM quantity by the U.S. Government. Of course Category IV quantities still require security protection but the protection is at a level that is considerably reduced from what is required for a 2.5 kg sphere of highly enriched uranium. The alloyed form of the HEU places the material in "Attractiveness Level C." "Attractiveness" is a measure of how useful a particular form of special nuclear material would be if diverted to rogue purposes. Again, these HEU alloys require security protection but the protection is at a level that is considerably reduced from what is required for a 2.5 kg sphere of highly enriched uranium. Furthermore, various embodiments of an apparatus for simulating special nuclear material that are disclosed herein may pass Nuclear Regulatory Commission tests to qualify as a "sealed source." These classifications greatly simplify the handling, monitoring, transport, and storage of an apparatus for testing a special nuclear material monitoring system. In addition, various embodiments of an apparatus for simulating special nuclear material that are disclosed herein provide a radioactive source that radiates substantially uniformly over a solid angle of substantially 4 pi steradians.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. An apparatus for simulating an actual special nuclear material source having a first quantity of enriched uranium and operable to radiate an actual special nuclear material spectrum, the apparatus comprising:
    a shell comprising a second quantity of enriched uranium, the second quantity of enriched uranium being smaller than the first quantity of enriched uranium of the actual special nuclear material source being simulated, the shell having an interior surface and an exterior surface;
    a depleted uranium core disposed within the shell;
    a spacer disposed adjacent the interior surface of the shell, for separating the depleted uranium core from the shell; and
    a cladding disposed adjacent the exterior surface of the enriched uranium shell,
    the apparatus being operable to radiate at least one simulated spectral line that generally matches an actual spectral line of the actual special nuclear material spectrum radiated from the actual special nuclear material source being simulated.

2. The apparatus of claim 1 wherein the shell, the depleted uranium core, the spacer, and the cladding are all substantially spherical in shape.

3. The apparatus of claim 1 wherein the spacer comprises a groove.

4. The apparatus of claim 1 wherein the spacer comprises a step.

5. The apparatus of claim 1 wherein the spacer comprises a groove and a step.

6. The apparatus of claim 1 wherein the shell comprises an alloy of enriched uranium.

7. The apparatus of claim 1 wherein the shell comprises an alloy having less than about five weight percent enriched uranium.

8. The apparatus of claim 1 wherein the shell comprises uranium enriched to greater than about ninety percent $^{235}$U.

9. The apparatus of claim 1 wherein the shell comprises less than about fifty grams of $^{235}$U.

10. An apparatus for simulating an actual special nuclear material source having a first quantity of enriched uranium and operable to radiate an actual special nuclear material spectrum, the apparatus comprising:
    a shell comprising a second quantity of enriched uranium, the second quantity of enriched uranium being smaller than the first quantity of enriched uranium of the actual special nuclear material source being simulated, the shell having an interior surface and an exterior surface;
    a depleted uranium core disposed within the shell;
    a spacer disposed adjacent the interior surface of the shell, for separating the depleted uranium core from the shell; and
    a cladding disposed adjacent the exterior surface of the enriched uranium shell,
    the apparatus being incapable of achieving nuclear criticality and operable to radiate at least one simulated spectral line that generally matches an actual spectral line of the actual special nuclear material spectrum radiated from the actual special nuclear material source being simulated.

11. The apparatus of claim 10 wherein the shell, the depleted uranium core, the spacer, and the cladding are all substantially spherical in shape.

12. The apparatus of claim 10 wherein the shell comprises an alloy of enriched uranium.

13. The apparatus of claim 12 wherein the alloy of enriched uranium includes an aluminum-uranium alloy.

14. The apparatus of claim 10 wherein the shell comprises an alloy having less than about five weight percent enriched uranium.

15. The apparatus of claim 10 wherein the shell comprises uranium enriched to greater than about ninety percent $^{235}$U.

16. The apparatus of claim 10 wherein the shell comprises less than about fifty grams of $^{235}$U.

17. An apparatus for simulating an actual special nuclear material source having a first quantity of enriched uranium and operable to radiate an actual special nuclear material spectrum, the apparatus comprising:
    a shell comprising an aluminum-uranium alloy having a second quantity of uranium enriched to greater than about ninety percent $^{235}$U, the second quantity of enriched uranium being smaller than the first quantity of enriched uranium of the actual special nuclear material source being simulated, the shell having an interior surface and an exterior surface;
    a depleted uranium core disposed within the shell;
    a spacer disposed adjacent the interior surface of the shell, for separating the depleted uranium core from the shell; and
    a cladding disposed adjacent the exterior surface of the enriched uranium shell,
    the apparatus being operable to radiate at least one simulated spectral line that generally matches an actual spectral line of the actual special nuclear material spectrum radiated from the actual special nuclear material source being simulated.

18. The apparatus of claim 17 wherein the apparatus is incapable of achieving nuclear criticality.

19. The apparatus of claim 17 wherein the shell comprises an alloy having less than about five weight percent enriched uranium.

20. The apparatus of claim 17 wherein the shell comprises less than about fifty grams of $^{235}$U.

* * * * *